United States Patent Office 3,552,238
Patented Jan. 5, 1971

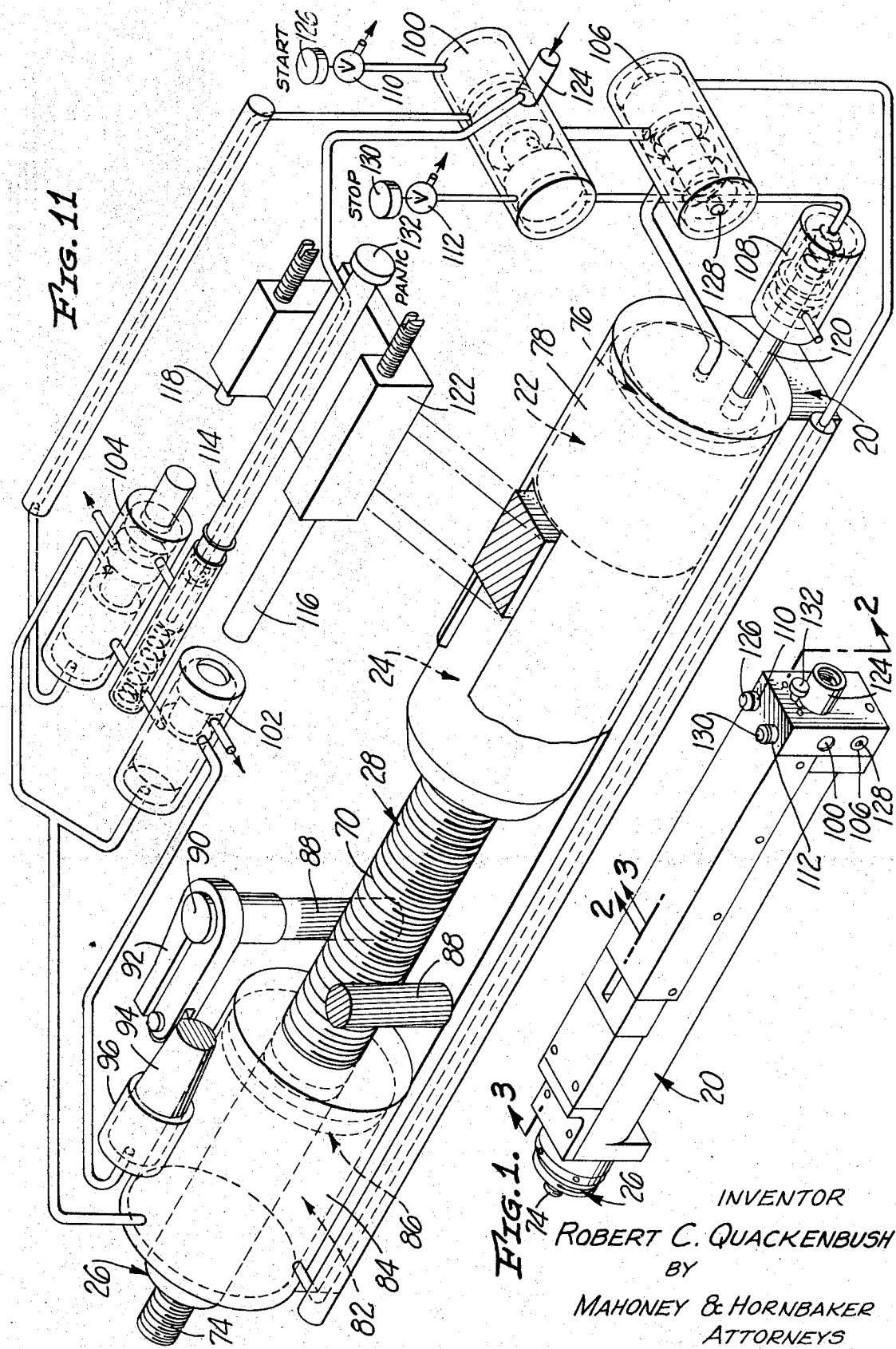

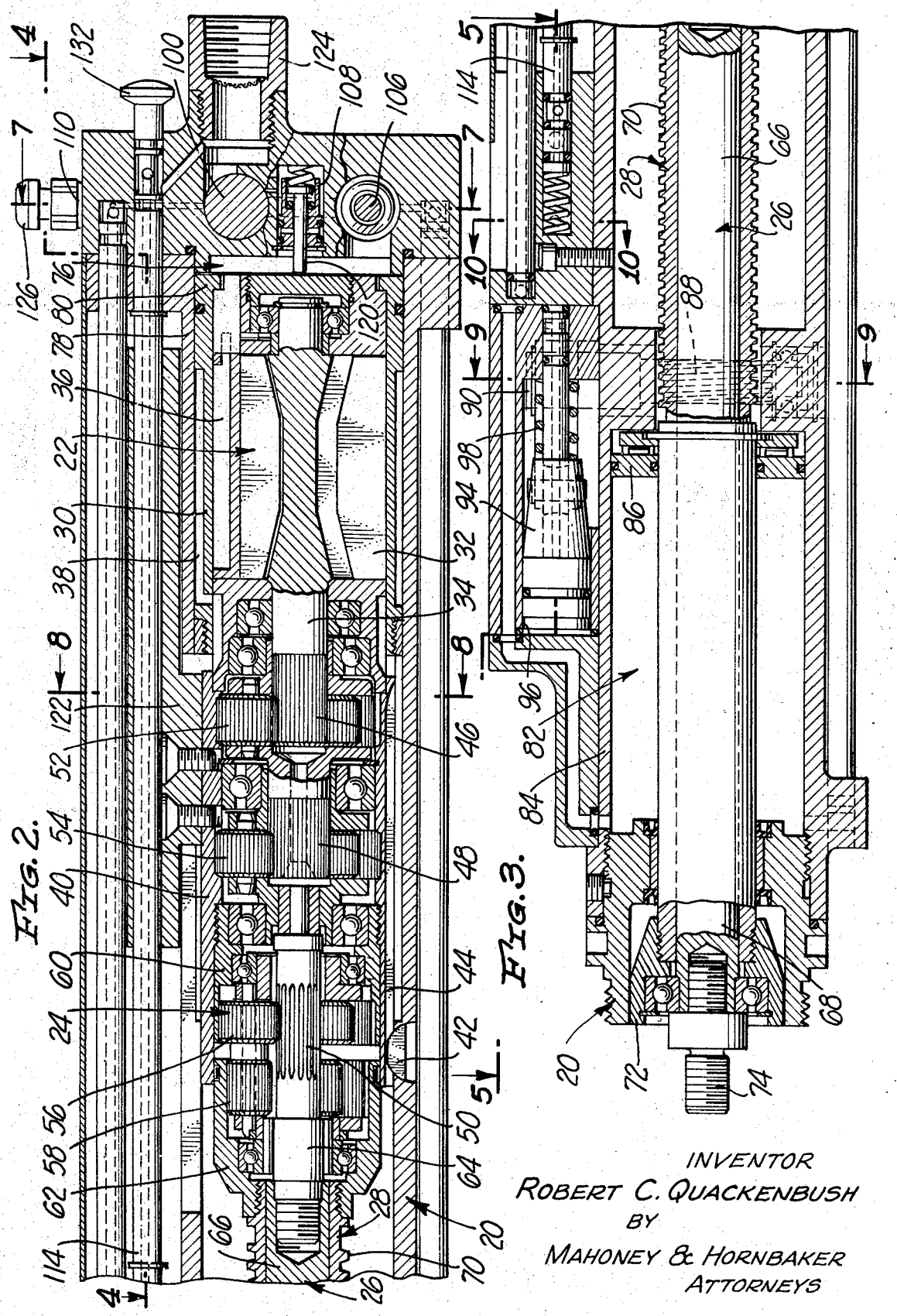

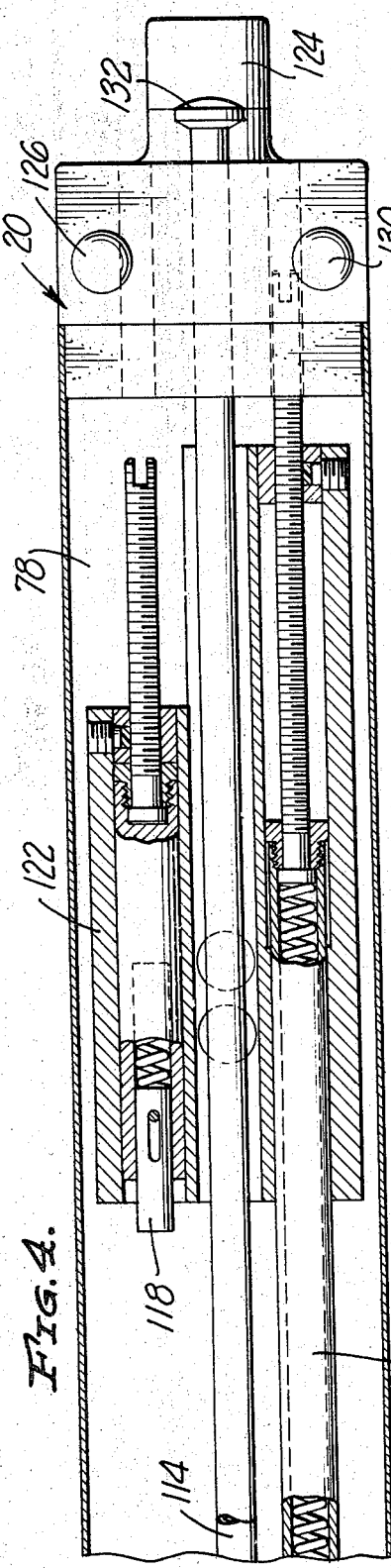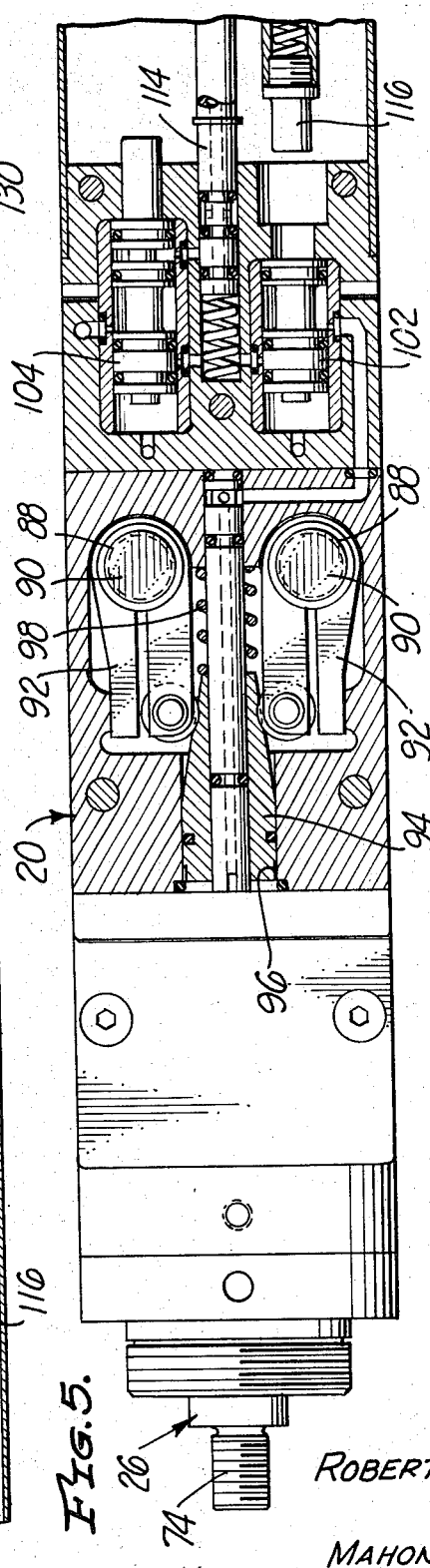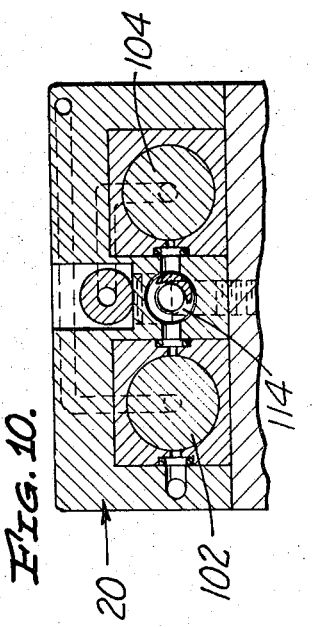

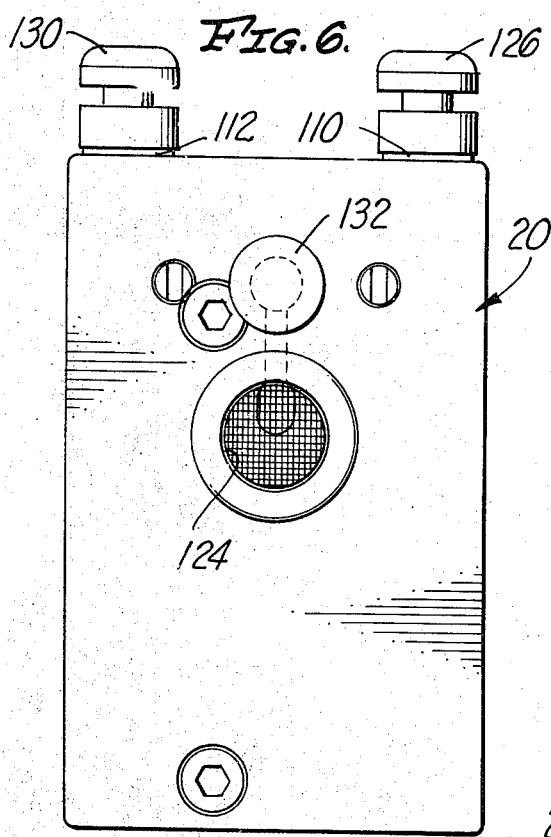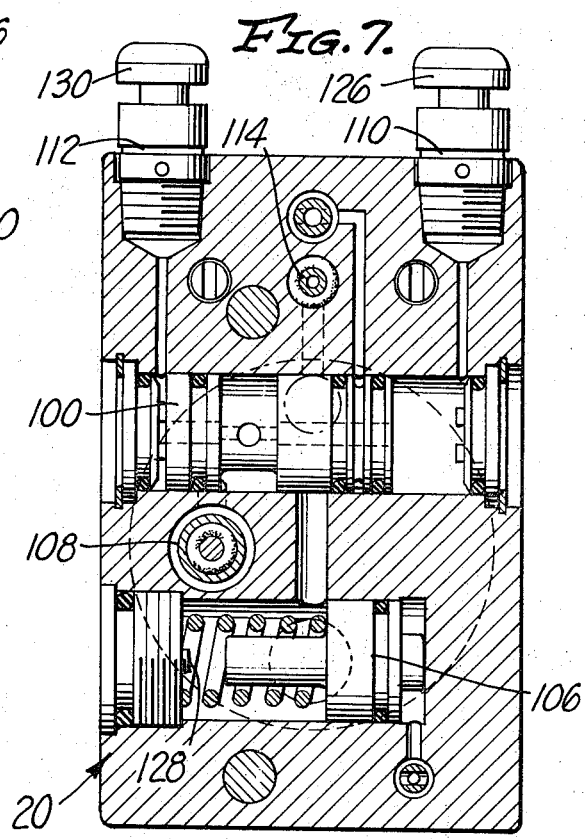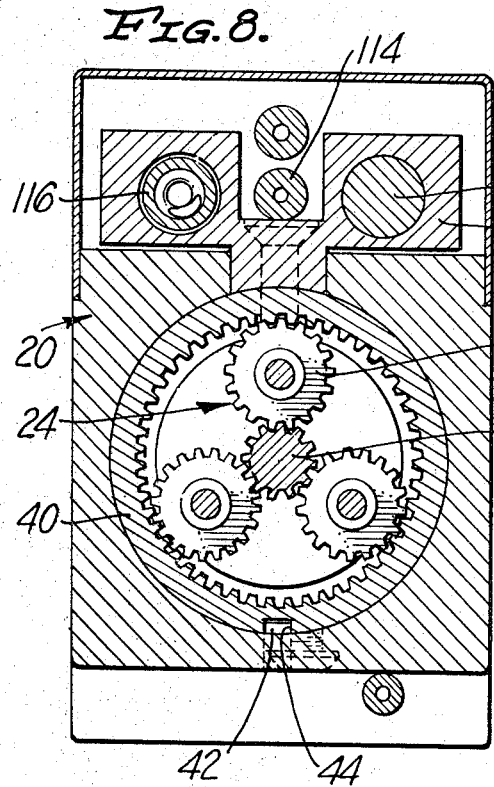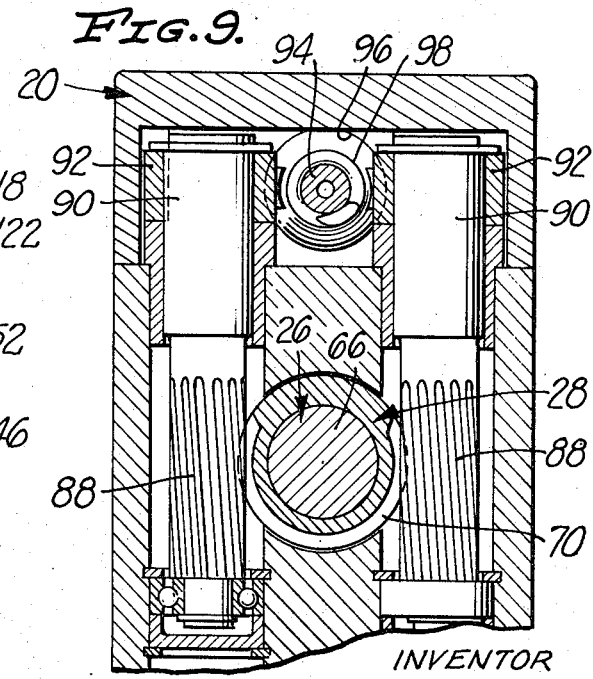

3,552,238
STRUCTURE FOR POSITIVELY FEEDING TOOLS
SUCH AS DRILLS AND THE LIKE
Robert C. Quackenbush, Glendale, Calif., assignor of one-half to Arthur B. Quackenbush, Glendale, Calif.
Filed June 19, 1968, Ser. No. 738,270
Int. Cl. B23b 39/10, 47/08, 47/22
U.S. Cl. 77—32.8                                    18 Claims

ABSTRACT OF THE DISCLOSURE

A drive motor is forwardly connected to a spindle and a lead screw, all generaly axially aligned and movable in a housing as a unit forwardly in a fast feed stroke part, then forwardly in a positive feed feed stroke part and then rearwardly in a fast retraction stroke. During the feed stroke, the unit is urged forwardly by a first fluid cylinder formed by a part of the housing surrounding the drive motor and a rearward part of the drive motor with lead screw nuts actionable with the lead screw to overpower the first fluid cylinder and control the unit movement during the positive feed feed stroke part. A second fluid cylinder formed by a part of the housing surrounding the spindle and a piston plate surrounding the spindle moves the unit rearwardly in the retraction stroke. The drive motor is a fluid motor and receives drive fluid directly internally of the first fluid cylinder. Selectively actionable stop means stops the unit movement at any point during said strokes, and selectively actionable return means automatically shifts the unit movement to the rearward retraction stroke at any time during the forward feed stroke.

BACKGROUND OF THE INVENTION

This invention relates to a structure for positively feeding tools such as drills and the like and more particularly, to such a structure wherein the drive motor, spindle and positive feeding means, such as a lead screw, are operably connected as a unit and movable forwardly and rearwardly within a housing as said unit in an automatic forward feed stroke and a rearward retraction stroke. Even more particularly, the means for moving the described unit may be formed directly from parts of said unit and associated surrounding parts of the housing which means controls movement of the unit except during the movement and control thereof by the positive feeding means. The result is the provision of a positively feeding structure of maximum compactness and efficiency, far greater than has heretofore been possible.

Various prior forms of positive feeding structures have been provided for positively feeding tools, such as drills and the like, to and into work pieces upon which a particular working operation is to be performed. Furthermore, certain of the prior positive feeding structures have included means incorporated therewith for automatically moving the particular tool at high speed to a proper location adjacent the particular work piece ready for the working operation to begin, then at a slower speed under positive feed control during the performance of the working operation on the work piece, and finally a withdrawal of the tool from the work piece again at high speed. A typical positive feed structure incorporating this high speed approach, positive feed and high speed withdrawal has included a main frame or housing mounting a drive motor at a stationary location thereon operably connected to a reciprocal or axially movable spindle having some form of positive feeding means, such as a telescoping lead screw associated therewith, the reciprocal movement of the spindle and positive feeding means when not under the sole positive feeding control being accomplished through various forms of fluid cylinders.

With the drive motor mounted at a stationary location on the housing and lead screw and positive feeding means movable relative thereto, it is necessary to provide a somewhat complex gear train system between the drive motor and spindle and positive feeding means assembly, not only to accomplish speed reduction from the drive motor output to the spindle and lead screw, but also to permit the necessary axial movement of the spindle and lead screw assembly relative to the drive motor. Thus, the power connecting gear train assembly has necessarily included various forms of splined connections for gearing making the over-all assembly quite massive and space consuming. Also, in order to provide the reciprocal movement of the lead screw and positive feeding means assembly, other than during the positive feeding period, various fluid cylinders have normally been mounted on the housing adjacent such assembly, again adding to the massiveness of the over-all construction.

Still further with the prior positive feeding structures, in addition to the automatically operable controls for providing the automatic cycling of the lead screw and positive feeding means assembly as described, emergency controls have normally been incorporated which may be selectively actuated by an operator to stop movement of the assembly at any point during the automatic cycle in the event of a malfunction in the working operation taking place. Upon the actuation of such emergency stop control, it has then been necessary to either manually remove the work piece from the tool or the tool including the entire housing assembly from the work piece, after which, movement of the spindle and positive feeding means assembly is then restarted to complete the cycle thereof and return the same to its retracted starting position. Obviously this results in quite a time consuming operation with consequent loss of normal production time.

OBJECTS AND SUMMARY OF THE INVENTION

It is, therefore, an object of this invention to provide a structure for positively feeding tools such as drills and the like wherein a unique and novel housing assembly results in a positive feeding structure of maximum compactness, while providing improved efficiency and positive operation. According to the present invention, the entire basic positive feeding structure including a drive motor, spindle and positive feeding means, such as a lead screw, is assembled as a single, reciprocally movable unit so as to be movable as said unit in feed and retraction strokes. As a result, the operable connection between the drive motor and the spindle and positive feeding means assembly can be greatly simplified since the drive motor, despite reciprocal movement of the positive feeding structure, always remains in the same relative position and movable with said spindle and positive feeding means assembly, obviously eliminating any necessity of the prior relative complex splined gear train connections therebetween.

It is a further object of this invention to provide a structure for positively feeding tools such as drills and the like having the foregoing unitary and compactness advantages which may incorporate a unique gear train connection between the drive motor and the lead screw and positive feeding means assembly which is totally incorporated in and movable with said unit, adding even further to the compactness thereof. The drive motor is preferably positioned at the rear of the reciprocally movable unit generally axially aligned with the spindle and positive feeding structure assembly, the power transmission connection therebetween preferably being accomplished by a series of planetary gear assemblies axially aligned in said unit therebetween. The planetary gear assemblies not only serve the necessary speed reduction purposes between the drive motor and the spindle, but also, where the positive feeding means is in the form of a lead screw, said planetary gear assemblies also serve to permit different rotational speed between the spindle and lead screw where the same is required.

It is still a further object of this invention to provide a structure for positively feeding tools such as drills and the like which may include all of the foregoing advantageous features and may incorporate unique moving means for the drive motor, spindle and positive feeding means unit for moving said unit in its feed and retraction strokes, said moving means adding even further to the compactness and efficiency of the over-all structure. With the drive motor, spindle and positive feeding means connected in said unit generally axially aligned and the drive motor at the rearward portion of said unit, first fluid cylinder means is formed by a portion of the structure housing surrounding the drive motor and a rearward part of the drive motor, the fluid pressure acting directly against the drive motor rearward part to move the entire unit forwardly in the unit feed stroke, at least until said forward feed stroke movement is taken over by the positive feeding means. Furthermore, second fluid cylinder means is formed by a portion of the structure housing surrounding the spindle and a piston portion likewise surrounding the spindle internally of said housing portion and directly connected for transmitting axial movement to said spindle, so that again, in effect, fluid pressure acts directly on the spindle to thereby move the over-all unit rearwardly in its rearward retraction stroke. Such unique construction, therefore eliminates the necessity of exteriorly mounted fluid cylinders and any complicated connection thereof to the unit for providing the required unit movements.

It is an additional object of this invention to provide a structure for positively feeding tools such as drills and the like which not only incorporates the previously described emergency stop means for stopping the movement of the tool into the work piece in the event of working malfunction, but also incorporates a unique emergency return means which, when selectively actuated, immediately shifts the movement of the spindle and its tool being fed thereby into the retraction stroke, thereby immediately returning the spindle and tool rearwardly to the starting position and withdrawn completely from the work piece. As a consequence, the conditions causing the tool working malfunction can immediately be corrected without carrying through a time consuming, tool or work piece withdrawal operation. In this manner, a large portion of the normal production time loss is avoided and the efficiency of the over-all operation is increased.

Other objects and advantages of the invention will be apparent from the following specification and the accompanying drawings which are for the purpose of illustration only.

BRIEF DESCRIPTION OF THE DRAWINGS

FIG. 1 is a perspective view of an embodiment of positive feeding structure for rotating and feeding tools and the like incorporating the principles of the present invention;

FIG. 2 is an enlarged, vertical sectional view looking in the direction of the arrows 2—2 in FIG. 1 and showing a rearward portion of the structure;

FIG. 3 is an enlarged, vertical sectional view looking in the direction of the arrows 3—3 in FIG. 1 and showing a forward portion of the structure;

FIG. 4 is a horizontal sectional view looking in the direction of the arrows 4—4 in FIG. 2;

FIG. 5 is a horizontal sectional view looking in the direction of the arrows 5—5 in FIG. 3;

FIG. 6 is an enlarged, rear elevational view of the structure of FIG. 1;

FIG. 7 is an enlarged, vertical sectional view looking in the direction of the arrows 7—7 in FIG. 2;

FIG. 8 is an enlarged, vertical sectional view looking in the direction of the arrows 8—8 in FIG. 2;

FIG. 9 is an enlarged, fragmentary, vertical sectional view looking in the direction of the arrows 9—9 in FIG. 3;

FIG. 10 is an enlarged, fragmentary vertical sectional view looking in the direction of the arrows 10—10 in FIG. 3; and FIG. 11 is an enlarged partially schematic and partially exploded view of the over-all positive feeding structure unit of FIG. 1 removed from the housing thereof.

DESCRIPTION OF THE BEST EMBODIMENT CONTEMPLATED

Referring particularly to FIGS. 1, 2 and 3, an embodiment of structure for positively feeding tools such as drills and the like incorporating the principles of the present invention is shown and includes a main frame or housing, generally indicated at 20, substantially enclosing and reciprocally mounting a unitary assembly comprising a preferably fluid actuated drive motor, generally indicated at 22, operably connected through an axially aligned gear train, generally indicated at 24, for rotating an axially aligned spindle, generally indicated at 26, and an axially aligned positive feeding mechanism preferably in the form of a spindle telescoping lead screw, generally indicated at 28. As stated, the drive motor 22, gear train 24, spindle 26 and quill or lead screw 28 are mounted in the housing 20 reciprocally movable as a unit relative to said housing, said movement being forwardly in a feed stroke and rearwardly in a retraction stroke, or respectively to the left and right as viewed in FIGS. 2 and 3. Furthermore, during said feed stroke, the spindle 26 is progressively partially projected or extended from the housing 20, and during said retraction stroke, the spindle is withdrawn or retracted into the housing.

The fluid motor 22 is of somewhat usual construction having an outer case 30 enclosing and rotatably mounting a vaned rotor 32, said rotor terminating forwardly in a drive shaft 34. The outer case 30 also incorporates fluid inlet passages 36 and fluid outlet passages 38 appropriately arranged for directing fluid, preferably air, to and from the rotor 32 for driving the same.

The gear train 24 is formed by a series of axially aligned planetary gear systems rotatable within a gear train sleeve 40, which sleeve is reciprocably movable within the housing 20, but is retained non-rotatable by a housing key 42 projecting transversely into an axially extending key slot 44 of said gear train sleeve. The planetary gear systems of the gear train 24 are formed by a series of sun gears 46, 48 and 50, and a series of planet gear assemblies 52, 54, 56 and 58, the planet gear assemblies 52 and 54 being internally rotatably engaged with the gear train sleeve 40, the planet gear assembly 56 being internally rotatably engaged with an auxiliary sleeve 60 of the gear train sleeve 40, and the planet gear assembly 58 being internally rotatably engaged with a lead screw driving sleeve 62. The sun gear 46 is formed directly on the drive shaft 34 of the drive motor 22, while the sun gear 50 is formed directly on a stub shaft 64 secured directly to and rotatably driving integral rearward and forward portions 66 and 68 of the spindle 26.

The planet gear assembly 58 is driven by the planet gear assembly 56 and in turn rotatably drives the lead screw driving sleeve 62 which is forwardly secured rotatably driving the quill or lead screw 28, said lead screw 28 telescoping both the spindle rearward and forward end portions 66 and 68, but being rotatable relative thereto.

Thus, as best seen in FIG. 2, the rotatable drive from the drive shaft 34 of the drive motor 22 is transferred progressively through the sun gear 46, the planet gear assembly 52, the sun gear 48, the planet gear assembly 54, and into the stub shaft 64 rotatably driving the spindle 26. At the same time, such rotatable drive is transferred from the stub shaft 64 progressively to the sun gear 50, the planet gear assembly 56, the planet gear assembly 58, and into the lead screw driving sleeve 62 for rotatably driving the quill or lead screw 28 at a different or reduced rotational speed from the drive of the spindle 26. The quill or lead screw 28 has the rearward portion thereof formed with lead screw threads 70 thereon and the forward portion of the quill or lead screw is forwardly secured to an end part 72, while the forward end of the spindle 26 rotatably drives a tool mounting member 74.

The means for reciprocally moving the unit formed by the drive motor 22, gear train 24, spindle 26 and lead screw 28 in the feed and retraction strokes, in addition to the forward positively feeding movement thereof by the lead screw 28 as will be hereinafter described, includes a first fluid cylinder, generally indicated at 76, a cylinder of which is formed by a housing portion 78 surrounding the drive motor outer case 30 and a piston of which is formed by a rearward part 80 of the drive motor 22, and a second fluid cylinder, generally indicated at 82, a cylinder of which is formed by a housing portion 84 normally surrounding the forward portion of the lead screw 28 prior to lead screw movement and a piston of which is formed by an annular piston plate 86 surrounding the lead screw forward portion secured for moving the lead screw and spindle 26 rearwardly therewith. Direction of fluid, such as air, into the first fluid cylinder 76, therefore, acts against the drive motor rearward part 80 and moves the entire unit formed by the drive motor 22, gear train 24, spindle 26 and lead screw 28 forwardly projecting the spindle progressively forward from the housing 20, and fluid directed into the second fluid cylinder 82, after said forward movement, acts against the piston plate 86 and moves the entire unit rearwardly retracting the spindle back into the housing. At the same time, the drive motor 22 is arranged for receiving its driving fluid to rotate the spindle 26 and lead screw 28 directly from internally of the first fluid cylinder 76 so that said drive motor will provide the rotative driving action throughout the period that the first fluid cylinder is receiving fluid therein.

As best seen in FIGS. 3, 5 and 9, positive feed actuating means in the form of two lead screw nuts 88 are mounted rotatable in the housing 20 extending transversely of and radially straddling the lead screw 28, at all times operably engaged with the lead screw threads 70. Upper end portions 90 of the lead screw nuts 88 are positioned engageable by brakes 92, said brakes normally being non-engaged with the nut upper end portions 90 permitting free rotation of the nuts 88, but being actuated for secure engagement of the nut upper end portions retaining the nuts stationary by a tapered piston 94 of a fluid actuated clutch or brake cylinder 96. The piston 94 of the brake cylinder 96 is normally retained free of actuating the brakes 92, or to the left as shown in FIG. 5, by a spring 98, but when fluid is directed into the end of the brake cylinder 96, the piston is moved to the right causing the brakes 92 to engage and hold the lead screw nuts 88 stationary.

The over-all cycle control and regulating system is a fluid, preferably air, control and regulating system which, when the automatic feed and retraction stroke cycle is started by starting the feed stroke, controls movement of the unit formed by the drive motor 22, gear train 24, spindle 26 and lead screw 28, first forwardly of the housing 20 in a fast feed stroke part, then forwardly in a positive feed feed stroke part and then rearwardly in a fast retraction stroke. Furthermore, the control system includes provision for stopping the unit movement at any point during the feed and retraction strokes, as well as means for immediately shifting the movement of the unit into the retraction stroke at any point during the feed stroke. Said control system includes a main control valve 100 (FIGS. 2, 7 and 11), a positive feed control valve 102 (FIGS. 5 and 11), a retraction cycle control valve 104 (FIGS. 5 and 11), a feed cycle control valve 106 (FIGS. 2, 7), a cycle termination stop valve 108 (FIGS. 2, 7 and 11), a start valve 110 (FIGS. 1, 2, 6, 7 and 11), an emergency stop valve 112 (FIGS. 1, 6, 7 and 11), an emergency return valve 114 (FIGS. 2, 3, 4, 5, 7 and 11), a positive feed start rod 116 (FIGS. 4, 5 and 11), and a retraction stroke start rod 118 (FIGS. 4 and 11), all to be hereinafter described.

The main control valve 100 is an exhaust operating spool valve, that is, a valve having a reciprocal spool therein with opposite ends of the valve constantly pressurized so that normally said spool will remain in the end of the valve where placed until the opposite valve end is exhausted which causes shifting of the spool to that opposite end. The positive feed and retraction cycle control valves 102 and 104 are mechanically actuated in one direction and pressure actuated in the opposite direction. The feed cycle control valve 106 is a partial spring operating spool valve wherein the spool thereof is normally retained at one end of the valve normally retaining the valve fully open, but fluid pressure against the spool forcing it to shift toward the opposite end of the valve causes the valve to either partially or fully close stopping the flow of fluid therethrough. The cycle termination stop valve 108, start valve 110 and emergency stop valve 112 are all plunger operated exhaust valves which normally remain closed stopping the flow of fluid therethrough, but upon actuation, permit the exhaust of fluid therethrough and into the atmosphere, while the emergency return valve 114 is merely a normally closed valve.

All of the control valves 100, 102, 104, 106 and 108 are shown in FIGS. 2 through 10 of the drawings in their positions ready for the initial start of the feed stroke, while the start valve 110, stop valve 112 and return valve 114 are likewise in their normally closed positions ready for the start of said feed stroke. The cycle termination stop valve 108, as seen in FIG. 2, is in an open exhausting position which is the position thereof during the retraction stroke. As will be hereinafter described in proper sequence, upon the drive motor 22 nearing the rearward end of the first fluid cylinder 76 approaching the termination of the unit retraction cycle, the rearward part 80 of the drive motor engages a plunger 120 of the cycle termination stop valve 108, which plunger projects forwardly into the first fluid cylinder 76, thereby forcing said plunger rearwardly to open said valve and permit fluid exhaust therethrough serving to terminate the cycle retraction stroke by shifting the main control valve 100. As will be hereinafter more clearly understood, the exhaust port of stop valve 108 is sufficiently small that when the main control valve 100 is once again actuated to start another feed cycle, said main control valve will shift to start said feed cycle despite said stop valve being initially open and exhausting fluid.

The positive feed start rod 116 and the retraction stroke start rod 118 are both mounted forwardly and rearwardly movable on a carriage 122 secured on and movable forwardly and rearwardly with the gear train sleeve 40, as best seen in FIGS. 2 and 4, both of said rods projecting forwardly from said carriage and such projection being forwardly and rearwardly selectively adjustable as shown. Furthermore both of said roads 116 and 118 are axially collapsible rods, the collapse thereof being resisted by appropriate springs as also shown in FIG. 4. The positive feed start rod 116 is aligned and adjusted for engaging the positive feed control valve 102 to shift said valve and begin the positive feed feed stroke part of the unit, while the retraction stroke start rod 118 is aligned and adjusted for engaging and shifting the retraction cycle control valve 104 to terminate the positive feed feed stroke part and commence the retraction stroke of the unit, all of which will be hereinafter described in proper sequence.

The operation of the structure for positively feeding tools of the present invention, as well as the fluid connections in said structure and throughout the control system thereof, can best be seen and understood by referring to the over-all, somewhat diagrammatic view of the structure shown in FIG. 11 wherein all of the elements are positioned ready for the start of a complete cycle of the structure. Furthermore, in FIG. 11, only a small representative portion of the main housing 20 is shown underlying the drive motor, gear train, spindle and lead screw unit so that the normal fluid directing passage between the various elements of the structure, which are for the main part passages formed in the main housing 20 as clearly shown in FIGS. 2 through 10, are shown merely as communicating tubing. With such showing, however, the direction of the fluid, in this case air, between the various elements of the structure may be more clearly seen and understood.

With the various elements of the structure in the position ready for the start of the feed and retraction cycle and a main source of air supply (not shown) connected to a main fluid inlet 124 at the rearward end of the housing 20 (FIGS. 2, 4 and 6), the main control valve 100 is pressurized but remains balanced in the position shown in FIG. 11, so that there is no air directed from the main control valve 100 into the feed cycle control valve 106, and consequently no air into the first fluid cylinder 76. At the same time, air is directed from the main fluid inlet 124 into and through the emergency return valve 114, and from said valve 114 into and pressurizing the positive feed control valve 102 and the retraction cycle control valve 104, the positive feed control valve positioning preventing air from passing into the brake cylinder 96 so that the brakes 92 remain free of engagement with the lead screw nuts 88 and the retraction cycle control valve positioning preventing air from passing into the second fluid cylinder 82 so that there is no rearward urging of the piston plate 86 of said second fluid cylinder. Thus, the unit of the drive motor 22, gear train 24, spindle 26 and lead screw 28 remains stationary at the rearward end of the housing 20, with the drive motor 22 at the rearward end of the first fluid cylinder 76 and against the plunger 120 of the cycle termination stop valve 108 retaining said valve open.

For starting movement axially of the unit in the automatic feed and retraction cycle, a start button 126 (FIGS. 1, 2, 4, 6, 7 and 11) is depressed opening the start valve 110 and exhausting air from the right hand end of the main control valve 100 to shift the spool thereof to that end and direct air from said main control valve 100 through the feed cycle control valve 106 and into the first fluid cylinder 76 at the rearward end of the drive motor 22. The flow of air into the first fluid cylinder 76 starts fast forward movement of the unit within the housing 20, while at the same time, provides air for the drive motor 22 starting driving rotation of the same to rotate both the spindle 26 and the lead screw 28 through the gear train 24 as hereinbefore described. In view of the freedom of engagement by the brakes 92, the lead screw nuts 88 through their operable connection with the lead screw 28 rotate freely with said lead screw and permit the fast forward movement of the unit in the fast feed stroke part.

Furthermore, when the start button 126 is depressed to initially shift the main control valve 100 to open position, there is sufficient exhaust through start valve 110 and sufficient fluid pressure in the left hand end of the main control valve to cause said shift, despite the fact that the cycle termination stop valve 108 is initially open as hereinbefore described. In other words, the fluid flow into the main control valve 100 is sufficiently greater than the exhaust of fluid through the restricted exhaust port of the stop valve 108 that said shifting of the main control valve takes place to start the unit feed cycle. As soon as the unit has made only a small increment of movement in said forward feed cycle, the plunger 120 of the stop valve is released permitting said valve to close.

The unit fast forward movement in the fast feed stroke part ultimately carries the positive feed start rod 116 into contact with the positive feed control valve 102 causing the shifting of the spool of said valve rearwardly as viewed in FIG. 11 and directing air into the brake cylinder 96. This shifts the piston 94 of the brake cylinder 96 rearwardly as viewed in FIG. 11 engaging the brakes 92 with the lead screws nuts 88 and retaining said lead screw nuts stationary. The result is that the operable engagement of the lead screw 28 with the now stationary lead screw nuts 88 overpowers the forward urging of the first fluid cylinder 76 so that the fast feed stroke part of the unit is terminated and the positive feed feed stroke part is commenced, the lead screw acting against the lead screw nuts causing positive feed of the spindle 26 and the remainder of the unit due to the continued rotation by the drive motor 22 of both the spindle 26 and lead screw 28.

During the entire forward feed stroke movement of the unit including the forward feed stroke projection of the spindle 26, the piston plate 86 of the second fluid cylinder 82 is being carried forwardly in said second fluid cylinder by the connection thereof to said spindle. Furthermore, the unit forward movement is at all times carrying the retraction stroke start rod 118 forwardly to ultimately approach contact with the retraction cycle control valve 104. The previously described collapsing construction of the positive feed start rod 116 permits the unit forward movement to continue during the unit positive feed feed stroke part despite the engagement of said positive feed start rod with the positive feed control valve 102.

As the unit finally approaches the forward end of the fast feed feed stroke part and the end of the over-all unit feed stroke, the retraction stroke start rod 118 contacts the retraction cycle control valve 104 shifting the spool of said valve rearwardly as viewed in FIG. 11. Shifting of the retraction cycle control valve 104 directs air into the rearward end of the positive feed control valve 102 shifting said valve rearwardly and causing the air in the brake cylinder 96 to exhaust through said positive feed control valve releasing the brakes 92 and once again permitting free rotation of the lead screw nuts 88. Shifting of the retraction cycle control valve 104 also directs air into the second fluid cylinder 82 to begin rearward urging of the piston plate 86 and rearward urging of the entire unit.

Air entering the second fluid cylinder 82 also causes the direction of said air from said second fluid cylinder to the right hand end of the feed cycle control valve 106 causing the spool thereof to shift to the left as viewed in FIG. 11 which essentially cuts off the flow of air to the first fluid cylinder 76, thereby permitting the start of fast rearward movement of the unit by the second fluid cylinder 82. This terminates the unit positive feed feed stroke part and commences the unit fast retraction stroke. It will be noted, as shown in FIG. 11, that the feed cycle control valve 106 includes an adjustment screw 128 which may be adjusted to limit the leftward shifting of the feed cycle control valve and thereby limit the closing of said valve, which in turn permits a continued limited amount of air flow into the first fluid cylnder 76 during the unit fast retraction stroke sufficient for driving the drive motor 22 and maintaining rotation of the spindle 26 and lead screw 28 throughout said retraction stroke.

Finally, after the major portion of the unit rearward fast retraction stroke and upon said unit approaching the rearward end of the housing 20, the drive motor 22 moving rearwardly in the first fluid cylinder 76 contacts the plunger 120 of the cycle termination stop valve 108, opening said valve and exhausting air from the left hand end of the main control valve 100 shifting the spool thereof back to the right or into the position shown in FIG. 11. The shifting of the main control valve 100 closes off any limited flow of air through the feed cycle control valve 106 into the first fluid cylinder 76 stopping any air to the drive motor 22 and stopping rotation of the spindle 26 and lead screw 28. Such shifting of the main control valve 100 also directs air to the rearward end of the retraction cycle control valve 104 shifting the spool thereof rearwardly cutting off air to the second fluid cylinder 82 and from said second fluid cylinder to the feed cycle control valve 106.

The release of air pressure from the feed cycle control valve 106 permits the spool thereof to be spring urged to the right as viewed in FIG. 11, fully opening said valve and placing it in position ready for the selective start of another automatic feed and retraction cycle of the unit. The plunger 120 of the cycle termination stop valve 108 remains engaged by the drive motor 22 retaining said stop valve open as hereinbefore described. Thus, all of the elements of the structure are in proper position for the selective start of another unit feed and retraction cycle, that is, the positions shown in FIG. 11.

If at any time during the unit feed and retraction cycle, it is desired to stop further forward or rearward movement of the unit and at the same time stop the rotation of the spindle 26, a stop button 130 (FIGS. 1, 4, 6, 7 and 11) may be depressed opening the emergency stop valve 112 exhausting air from the left hand end of the main control valve 100 which causes shifting of the spool of said valve to the left or the position shown in FIG. 11. Such shifting of the main control valve 100 cuts off the flow of air through the feed cycle control valve 106 and into the first fluid cylinder 76 regardless of whether said feed cycle control valve is then permitting full air flow into the first fluid cylinder or whether only limited air flow is being permitted. The shifting of the main control valve 100 also directs air to the rearward end of the retraction cycle control valve 104 cutting off any possible flow of air to the second fluid cylinder 82.

Thus, despite the particular positioning of the unit during its automatic feed and retraction cycle, depressing the stop button 130 immediately terminates any forward or rearward movement of the unit, as well as spindle rotation. Restarting of the unit movement may be accomplished merely by depressing the start button 126 which will return all of the structure elements to the proper position for continuing and automatically carrying out the remainder of the particular feed and retraction cycle.

If, at any time during the unit feed and retraction cycle, a malfunction occurs which would make it desirable to immediately shift the unit movement into the fast retraction stroke and return the same to the starting position, an emergency return button 132 (FIGS. 1, 2, 3, 6 and 11) is forwardly depressed opening the emergency return valve 114. Obviously, this emergency return button 132 and the opening of the emergency return valve 114 would only be used during the unit feed stroke in either the fast feed stroke part or positive feed stroke part, since during the unit fast retraction stroke, it is already shifted into said rearward retraction movement.

Opening of the emergency return valve 114 from its normally closed position, directs air into the rearward end of the retraction cycle control valve 104 forcing the spool thereof forwardly directing air into the second fluid cylinder 82, as well as from said second fluid cylinder 82 to the right hand end of the feed cycle control valve 106 forcing said valve to close or partially close. If, at the particular moment of the opening of the emergency return valve 114, the positive feed control valve 102 is shifted rearwardly engaging the brakes 92 with the lead screw nuts 88 which would be during the positive feed feed stroke part, the shifting of the retraction cycle control valve 104 will direct air to the rearward end of the positive feed control valve 102 shifting it rearwardly to the position shown in FIG. 11 and exhausting air from the brake cylinder 96 for releasing the lead screw nuts 88.

Thus, despite the location of the unit in the forward feed stroke, the same will be immediately shifted into the fast retraction stroke. Furthermore, the unit will continue normal rearward movement in its fast retraction stroke and automatically terminate rearward movement in the normal, previously described manner. In the event of a malfunction, therefore, the unit including the spindle 26 may be immediately withdrawn on an emergency basis merely by depression of the emergency return button 132.

According to the principles of the present invention, therefore, a structure for positively feeding tools such as drills and the like is prvided which is of far greater compactness than has heretofore been possible. The provision of the drive motor 22, gear train 24, spindle 26 and lead screw 28, all movable as a unit in the feed and retraction stroke, the provision of the gear train 24 with the unit planetary gear systems thereof for operably connecting the drive motor 22 to the spindle 26 and lead screw 28, the provision of the first and second fluid cylinders 76 and 82 directly incorporated with the drive motor 22 and the spindle 26, and the provision of the fluid supply to the drive motor 22 directly from internally of the first fluid cylinder 76, each add to the compactness and relatively foolproof operation of the over-all structure. Further, the still additional incorporation of the emergency stop and emergency return systems therein as hereinbefore described add advantageous features not included in prior construction.

I claim:

1. In a positive feeding structure for rotating and feeding tools and the like, the combination of: a housing; a spindle and a lead screw rotatably mounted in said housing; a drive motor in said housing operably connected to said spidle and lead screw for rotatably driving the same; mounting means operably connecting said drive motor, spindle and lead screw movable in said housing as a unit forwardly and rearwardly in opposite feed and retraction strokes, said movement axially projecting a portion of said spindle from said housing in said feed stroke; and unit moving means operably connected to said drive motor, spindle and lead screw unit for moving said unit in said feed and retraction strokes including lead screw nut means actionable with said lead screw during at least part of said feed stroke for moving said unit by and under the control of said lead screw at least during said feed stroke part.

2. A positive feeding structure as defined in claim 1 in which said unit moving means includes fluid cylinder means operably connected to said drive motor, spindle and lead screw unit for moving said unit in said feed and retraction strokes except when said unit is moved by and under the control of said lead screw.

3. A positive feeding structure as defined in claim 1 in which said spindle, lead screw and drive motor are generally axially aligned in said housing with said drive motor rearward of said spindle and lead screw; and in which said unit moving means includes first fluid cylinder means operably connected to said drive motor for moving said unit forwardly in said feed stroke except during movement of said unit by and under the control of said lead screw, second fluid cylinder means operably connected actionable with said spindle and lead screw for moving said unit rearwardly in said retraction stroke.

4. A positive feeding structure as defined in claim 1 in which said spindle, lead screw and drive motor are generally axially aligned in said housing with said drive motor rearwardly of said spindle and lead screw; and in which said unit moving means includes first fluid cylinder means having a cylinder thereof formed by a portion of said housing surrounding said drive motor and a piston thereof formed by a rearward part of said drive motor for moving said unit through fluid pressure against said drive motor rearward portion forwardly in said feed stroke except during movement of said unit by and under the control of said lead screw, second fluid cylinder means having a cylinder thereof formed by a portion of said housing surrounding a portion of at least said spindle and a piston thereof formed by piston means operably connected to said spindle for moving said unit through fluid pressure exerted against said piston means rearwardly in said retraction stroke.

5. A positive feeding structure as defined in claim 1 in which said spindle, lead screw and drive motor are generally axially aligned in said housing with said drive motor rearwardly of said spindle and lead screw; in which said unit moving means includes first fluid cylinder means having a cylinder thereof formed by a portion of said housing surrounding said drive motor and a piston thereof formed by a rearward part of said drive motor for moving said unit through fluid pressure against said drive motor rearward portion forwardly in said feed stoke except during movement of said unit by and under the control of said lead screw, second fluid cylinder means having a cylinder thereof formed by a portion of said housing surrounding a portion of at least said spindle and a piston thereof formed by piston means operably connected to said spindle for moving said unit through fluid pressure exerted against said piston means rearwardly in said retraction stroke; in which said drive motor is a fluid actuated drive motor having fluid inlet means at all times in communication with said first fluid cylinder means for receiving fluid to drive said drive motor directly from and during the supplying of fluid to said first fluid cylinder; and in which control means directs a sufficient supply of fluid into said first fluid cylinder means to drive said drive motor throughout said unit forward feed stroke and simultaneously actuate said first fluid cylinder means to move said unit in said unit forward feed stroke at least until said movement of said unit is by and under the control of said lead screw, said control means at least reducing said fluid supply to said first fluid cylinder means throughout said unit rearward retraction stroke permitting said second fluid cylinder means to move said unit rearwardly in said retraction stroke.

6. A positive feeding structure as defined in claim 1 in which said spindle, lead screw and drive motor are generally axially aligned in said housing with said drive motor rearwardly of said spindle and lead screw; in which said unit moving means includes first fluid cylinder means having a cylinder thereof formed by a portion of said housing surrounding said drive motor and a piston thereof formed by a rearwardly part of said drive motor for moving said unit through fluid pressure against said drive motor rearward portion forwardly in said feed stroke except during movement of said unit by and under the control of said lead screw, second fluid cylinder means having a cylinder thereof formed by a portion of said housing surrounding a portion of at least said spindle and a piston thereof formed by piston means operably connected to said spindle for moving said unit through fluid pressure exerted against said piston means rearwardly in said retraction stroke; in which said drive motor is a fluid actuated drive motor having fluid inlet means at all times in communication with said first fluid cylinder means for receiving fluid to drive said drive motor directly from and during the supplying of fluid to said first fluid cylinder; and in which control means directs a sufficient supply of fluid into said first fluid cylinder means to drive said drive motor throughout said unit forward feed stroke and simultaneously actuate said first fluid cylinder means to move said unit in said unit forward feed stroke at least until said movement of said unit is by and under the control of said lead screw, said control means reducing said fluid supply to said first fluid cylinder means throughout said unit rearward retraction stroke sufficient to permit said second fluid cylinder means to move said unit in said unit rearward retraction stroke while still maintaining sufficient fluid supply to said first fluid cylinder means for continuing to drive said drive motor throughout said unit rearward retraction stroke.

7. A positive feeding structure as defined in claim 1 in which said unit moving means includes fluid cylinder means operably connected to said unit urging said unit to move forwardly throughout said forward feed stroke and urging said unit to move rearwardly throughout said unit rearward retraction stroke, said lead screw and said lead screw nut means overpowering said fluid cylinder means during said part of said feed stroke and maintaining said control of said unit movement through said lead screw during said feed stroke part.

8. A positive feeding structure as defined in claim 1 in which control means is operably connected to said unit moving means for initially moving said unit forwardly in a fast feed stroke part and then actuating said lead screw and lead screw nut means to move said unit forwardly in a positive feed feed stroke part and then move said unit rearwardly in a fast rearward retraction stroke, all continuously and automatically once said fast forward feed stroke part is started; and in which said control means includes stop means selectively actionable for stopping movement of said unit at any stage of movement throughout said unit feed and retraction stokes, return means selectively actionable for immediately beginning rearward retraction movement of said unit at any stage of unit movement throughout said unit forward feed stroke.

9. A positive feeding structure as defined in claim 1 in which control means is operably connected to said unit moving means for initially moving said unit forwardly in a fast feed stroke part and then actuating said lead screw and lead screw nut means to move said unit forwardly in a positive feed feed stroke part and then move said unit rearwardly in a fast rearward retraction stroke, all continuously and automatically once said fast forward feed stroke part is started; and in which said control means includes a first actuating rod secured movable with said unit engaging nut control means intermediate said unit forward feed stroke to cause actuation of said lead screw nut with said lead screw and commence said positive feed feed stroke part, a second actuating rod secured movable with said unit engaging retraction stroke control means at the end of said unit positive feed feed stroke part to terminate actuation of said lead screw nut with said lead screw and commence rearward movement of said unit in said unit fast retraction stroke.

10. A positive feeding structure as defined in claim 1 in which said spindle, lead screw and drive motor are all generally axially aligned with said drive motor rearward of said spindle and lead screw; and in which a series of planetary gear systems are operably connected in said unit actionable between said drive motor and said spindle and lead screw transmitting rotatable drive between said drive motor and said spindle and lead screw, there being at least one additional planetary gear system actionable between said drive motor and said lead screw than actionable between said drive motor and said spindle for rotating said spindle at a different speed than the rotation of said lead screw.

11. In a positive feeding structure for rotating and feeding tools and the like, the combination of: a housing; a spindle rotatably mounted in said housing; means mounting said spindle in said housing movable forwardly and rearwardly in opposite feed and retraction strokes, said movement axially projecting a portion of said spindle from said housing in said feed stroke; means operably connected to said spindle for moving said spindle in a continuous cycle of a fast forward feed stroke part and then a positive feed feed stroke part and then a fast rearward retraction stroke including a lead screw and nut assembly connected with at least a part thereof movable forwardly and rearwardly exactly with said spindle and actionable for positively forwardly feeding said spindle during said positive feed feed stroke part; a drive motor operably connected to said spindle for rotatably driving said spindle at least during said positive feed feed stroke part; and control means including selectively actionable stop means for stopping at least said forward and rearward movement of said spindle and lead screw and nut assembly part at any point during said feed and retraction strokes, selectively actionable return means for immediately moving said spindle and lead screw and nut assembly part rearwardly in a part of said retraction stroke at any point during said feed stroke.

12. A positive feeding structure as defined in claim 11 in which said means moving said spindle and lead screw and nut assembly part in said feed and retraction strokes includes fluid cylinder means for moving said spindle and lead screw and nut assembly part in at least said fast feed stroke part and said retraction stroke, fluid actuating means actuating said lead screw and nut assembly moving said spindle in said positive feed feed stroke part; in which said stop means of said control means when actuated stops operation of said fluid cylinder means of said spindle moving means and deactuates said fluid actuating means of said lead screw and nut assembly; and in which said return means of said control means when actuated reverses operation of said fluid cylinder means of said spindle moving means from said feed to said retraction stroke and deactuates said fluid actuating means of said lead screw and nut assembly if the same is then actuated.

13. A positive feeding structure as defined in claim 11 in which mounting means operably connects said spindle, drive motor and part of said lead screw and nut assembly movable in said housing as a unit in said feed and retraction strokes, said lead screw and nut assembly controlling movement of said unit at least during said positive feed feed stroke part; in which said means for moving said spindle and lead screw and nut assembly part further includes fluid cylinder means operable for moving said unit at least during said fast feed stroke part and said retraction stroke; and in which said control means includes means for operating said fluid cylinder means of said spindle moving means, means for actuating and deactuating said lead screw and nut assembly at commencement and termination of said positive feed feed stroke part.

14. In a positive feeding structure for rotating and feeding tools and the like, the combination of: a housing; a spindle rotatably mounted in said housing; a positive feeding lead screw and nut assembly having at least a part thereof forwardly and rearwardly movably mounted in said housing; a drive motor in said housing operably connected at least to said spindle for rotatably driving the same; mounting means operably connecting said drive motor, spindle and lead screw and nut assembly part movable in said housing as a unit forwardly and rearwardly in opposite feed and retraction strokes, said movement axially projecting a portion of said spindle from said housing in said feed stroke; and unit moving means operably connected to said drive motor, spindle and lead screw and nut assembly part unit for moving said unit in said feed and retraction strokes including lead screw and nut assembly actuating means actionable on said lead screw and nut assembly during at least part of said feed stroke for moving said unit by and under the control of said lead screw and nut assembly at least during said feed stroke part.

15. A positive feeding structure as defined in claim 14 in which said unit moving means includes fluid cylinder means constantly urging said unit forwardly throughout said feed stroke and constantly urging said unit rearwardly throughout said retraction stroke, said lead screw and nut assembly upon said actuating means actuation thereof overpowering said fluid cylinder means and maintaining control of movement of said unit during said feed stroke part.

16. A positive feeding structure as defined in claim 14 in which said drive motor, spindle and lead screw and nut assembly part are aligned generally axially relative to said spindle; in which said unit moving means includes first fluid cylinder means having a cylinder portion formed by a part of said housing around said drive motor and a piston portion formed by a rearward portion of said drive motor for moving said unit in that part of said feed stroke during which said unit movement is free of movement and control by said lead screw and nut assembly and said actuating means thereof, said first fluid cylinder means constantly urging said unit forwardly throughout said feed stroke with said lead screw and nut assembly upon said actuating means actuation thereof overpowering said first fluid cylinder means during that part of said feed stroke in which said unit is moved and controlled by said lead screw and nut assembly, second fluid cylinder means having a cylinder portion formed by a part of said housing and piston portion operably connected to and axially movable with said spindle for moving said unit in said retraction stroke.

17. A positive feeding structure as defined in claim 14 in which said drive motor, spindle and lead screw and nut assembly part are aligned generally axially relative to said spindle; in which said unit moving means includes first fluid cylinder means having a cylinder portion formed by a part of said housing around said drive motor and a piston portion formed by a rearward portion of said drive motor for moving said unit in that part of said feed stroke during which said unit movement is free of movement and control by said lead screw and nut assembly and said actuating means thereof, said first fluid cylinder means constantly urging said unit forwardly throughout said feed stroke with said lead screw and nut assembly upon said actuating means actuation thereof overpowering said first fluid cylinder means during that feed stroke part in which said unit movement is controlled by said lead screw and nut assembly, second fluid cylinder means having a cylinder portion formed by a part of said housing and a piston portion operably connected to and axially movable with said spindle for moving said unit in said retraction stroke; in which said drive motor is a fluid actuated drive motor having fluid inlet means internally of said first fluid cylinder means of said unit moving means receiving fluid directly from said first fluid cylinder means to drive said drive motor; and in which said unit moving means includes control means for directing fluid into said first fluid cylinder means of said unit moving means during said feed stroke and directing fluid into said second fluid cylinder means of said unit moving means during said retraction stroke.

18. In a positive feeding structure for rotating and feeding tools and the like, the combination of: a housing; a spindle rotatably mounted in said housing; a positive feeding mechanism movably mounted in said housing; a drive motor in said housing operably connected at least to said spindle for rotatably driving the same; mounting means operably connecting said drive motor, spindle and positive feeding mechanism movable in said housing as a unit forwardly and rearwardly in opposite feed and retraction strokes, said movement axially projecting a portion of said spindle from said housing in said feed stroke; and unit moving means operably connected to said drive motor, spindle and positive feeding mechanism unit for moving said unit in said feed and retraction strokes including, positive feed actuating means actionable with said positive feeding mechanism during a positive feed part of said feed stroke for moving said unit by and under the control of said positive feeding mechanism during said positive feed feed stroke part, control means operably connected to said unit for first moving said unit in a fast feed stroke part and then actuating said positive feed actuating means moving said unit in positive feed during said positive feed feed stroke part and then moving said unit in a fast retraction stroke, selectively actionable stop means for stopping movement of said unit when actuated at any point during either of said feed and retraction strokes, said stop means deactuating said positive feed actuating means upon actuating of said stop means during said positive feed feed stroke part, selectively actionable return means for shifting movement of said unit into its retraction stroke immediately upon actuation of said return means during any part of said feed stroke, said return means deactuating said positive feed actuating means upon actuation of said return means during said positive feed feed stroke part.

References Cited
UNITED STATES PATENTS

| | | | |
|---|---|---|---|
| 3,411,385 | 11/1968 | Quackenbush | 77—32.8 |
| 2,881,589 | 4/1959 | Hitt et al. | 77—33.5X |
| 2,860,531 | 11/1958 | DeGroff | 77—33.5 |

FRANCIS S. HUSAR, Primary Examiner

U.S. Cl. X.R.

77—33.5, 34.4